United States Patent
Glaess et al.

(10) Patent No.: US 12,367,900 B2
(45) Date of Patent: Jul. 22, 2025

(54) TRANSITIONAL LOAD BEAM RAIL FOR HARD DISK DRIVE SUSPENSIONS

(71) Applicant: Magnecomp Corporation, Murrieta, CA (US)

(72) Inventors: David Glaess, Bangkok (TH); Kuen Chee Ee, Chino, CA (US); Long Zhang, Winchester, CA (US)

(73) Assignee: Magnecomp Corporation, Murrieta, CA (US)

( * ) Notice: Subject to any disclaimer, the term of this patent is extended or adjusted under 35 U.S.C. 154(b) by 283 days.

(21) Appl. No.: 17/949,037

(22) Filed: Sep. 20, 2022

(65) Prior Publication Data

US 2023/0104763 A1   Apr. 6, 2023

Related U.S. Application Data

(60) Provisional application No. 63/248,240, filed on Sep. 24, 2021.

(51) Int. Cl.
   *G11B 5/48* (2006.01)
   *G11B 5/54* (2006.01)
   *G11B 21/12* (2006.01)
   *G11B 21/22* (2006.01)

(52) U.S. Cl.
   CPC .............. *G11B 5/4833* (2013.01); *G11B 5/54* (2013.01); *G11B 21/12* (2013.01); *G11B 21/22* (2013.01)

(58) Field of Classification Search
   None
   See application file for complete search history.

(56) References Cited

U.S. PATENT DOCUMENTS

| | | | |
|---|---|---|---|
| 6,483,670 B1 * | 11/2002 | Watanabe | G11B 5/4833 360/245.7 |
| 6,697,226 B1 | 2/2004 | Narayan et al. | |
| 7,518,829 B1 | 4/2009 | Drape et al. | |
| 7,551,399 B2 * | 6/2009 | Kido et al. | G11B 5/4813 360/244.3 |
| 7,595,962 B2 | 9/2009 | Takikawa et al. | |
| 7,706,106 B1 | 4/2010 | Mei et al. | |
| 7,724,476 B1 | 5/2010 | Bjorstrom et al. | |
| 8,120,880 B2 * | 2/2012 | Heo et al. | G11B 5/4833 360/255 |
| 8,228,638 B1 | 7/2012 | Wielenga | |

(Continued)

OTHER PUBLICATIONS

International Search Report and Written Opinion in International Application No. PCT/US2022/044299, mailed Jan. 3, 2023.

(Continued)

*Primary Examiner* — Craig A. Renner
(74) *Attorney, Agent, or Firm* — DLA Piper LLP (US)

(57) ABSTRACT

Examples of a load beam are described herein that include a lifter tab extending towards a distal end, a dustpan defined by a dustpan forming line at a proximal end and the lifter tab at a distal end and a first and second plurality of rail sections separated by a longitudinal axis. The first and second plurality rail sections including a rear rail, an intermediate rail, and a front rail. The rear rail extends from a proximal end of the load beam to the first intermediate rail, the intermediate rail extends from the first rear rail to the dustpan forming line, and the front rail extends from the dustpan forming line to a proximal end of the lifter tab.

13 Claims, 3 Drawing Sheets

(56) References Cited

U.S. PATENT DOCUMENTS

| | | | |
|---|---|---|---|
| 8,472,144 B2* | 6/2013 | Fujimoto | G11B 5/4833 360/244.9 |
| 9,064,513 B1 | 6/2015 | Pan et al. | |
| 9,129,618 B1 | 9/2015 | Tsuchida et al. | |
| 11,056,137 B1* | 7/2021 | Teo | G11B 5/4833 |

OTHER PUBLICATIONS

International Preliminary Report on Patentability in International Application No. PCT/US2022/044299, mailed Apr. 4, 2024.

* cited by examiner

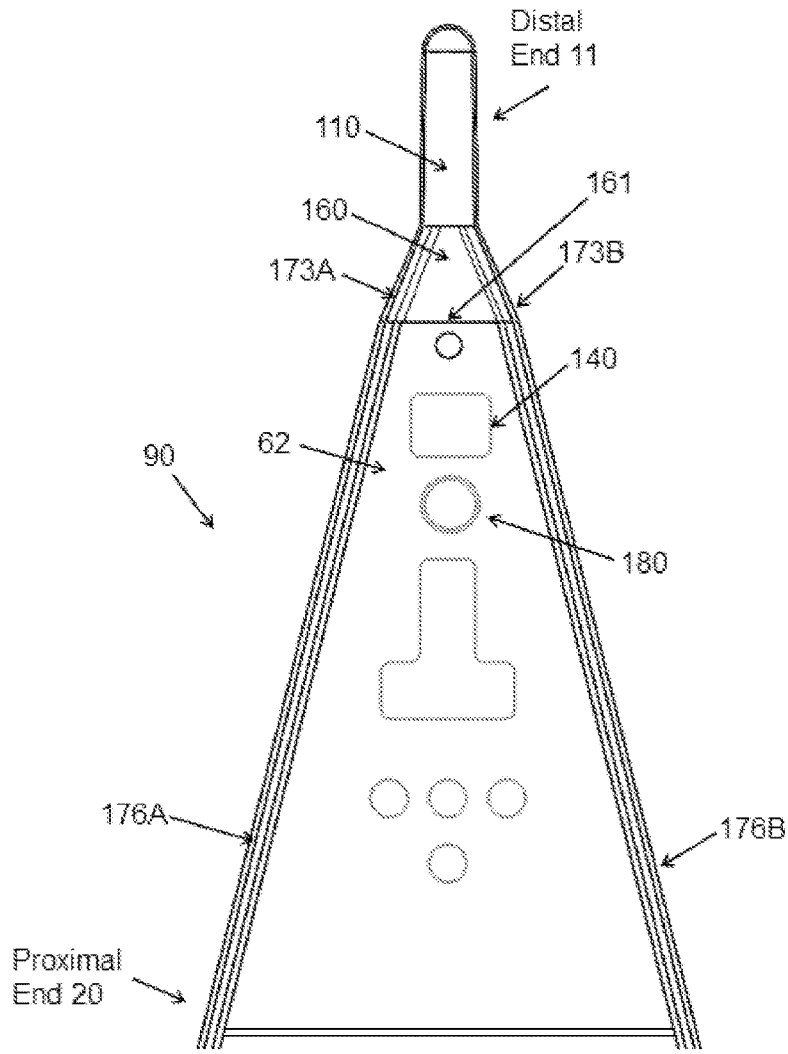
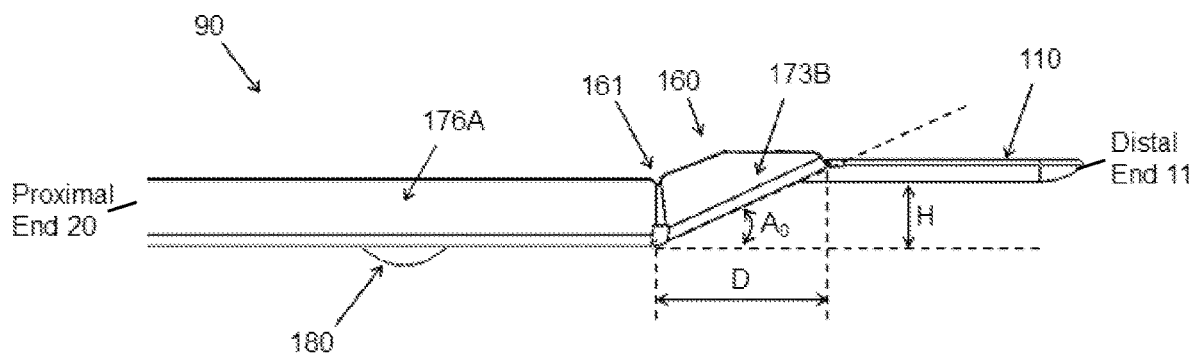
Figure 2
Figure 3

TRANSITIONAL LOAD BEAM RAIL FOR HARD DISK DRIVE SUSPENSIONS

CROSS-REFERENCE TO RELATED APPLICATIONS

This application claims the benefit of, and priority to, U.S. Provisional Application No. 63/248,240 filed on Sep. 24, 2021, which is hereby incorporated by reference in its entirety.

FIELD

This present disclosure relates generally to suspension systems for hard disk drive systems. More specifically, the disclosure relates to load beams used in hard disk drive suspension assemblies.

DESCRIPTION OF RELATED ART

Information storage devices typically include a head for reading and/or writing data onto the storage medium, such as a disk within a rigid disk drive. An actuator mechanism is used for positioning the head at specific locations or tracks in accordance with the disk drive usage. Linear and rotary actuators are known based on the manner of movement of the head. Head suspensions are provided between the actuator and the head and support the head in proper orientation relative to the disk surface.

In a rigid disk drive, head suspensions are provided which support a read/write head to fly over the surface of the rigid disk when it is spinning. Specifically, the head is typically located on a slider having an aerodynamic design so that the slider flies on an air bearing generated by the spinning disk. In order to establish the fly height, the head suspension is also provided with a spring force counteracting the aerodynamic lift force.

A head suspension of the type used in a rigid disk drive comprises a load beam and a flexure to which the slider is to be mounted. Load beams normally have an actuator mounting portion, a rigid section, and a spring region between the actuator mounting region and the rigid section for providing the aforementioned spring force. The flexure is provided at the distal end of the load beam to which the slider is mounted and permits pitch and roll movements of the slider to follow disk surface fluctuations. Flexures are known that are integrated into the design of the load beam and those formed as a separate element fixed to the rigid region of the load beam.

In providing the spring force to the rigid section of the load beam for counteracting the aerodynamic lift force against a slider, a preformed bend or radius is made in the spring region of the load beam. The radius provides the spring force and thus a desired gram loading to the slider for a predetermined offset height, the offset height being a measurement of the distance between the mounting height of the head suspension and the slider at "fly" height. Constraints of the drive design, including the spacing of the disks within the drive, factor into the predetermined offset height. In any case, the gram load at the offset height provides the counteracting force to the aerodynamic lift force to establish the "fly" height of the slider above a disk surface. As used hereinafter, the term "loaded" head suspension means the head suspension combined with the slider at "fly" height and in equilibrium under the influence of the aerodynamic lift force and the oppositely acting spring force.

SUMMARY

A load beam and related methods are described. One embodiment of the load beam includes a lifter tab extending towards a distal end, a dustpan defined by a dustpan forming line at a proximal end and the lifter tab at a distal end and a first and second plurality of rail sections separated by a longitudinal axis. The first and second plurality rail sections including a rear rail, an intermediate rail, and a front rail. The rear rail extends from a proximal end of the load beam to the first intermediate rail, the intermediate rail extends from the first rear rail to the dustpan forming line, and the front rail extends from the dustpan forming line to a proximal end of the lifter tab.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 2 illustrates a top view of a load beam of the suspension assembly of FIG. 1, according to an example of the disclosure;

FIG. 3 illustrates a side view of the load beam of FIG. 2, according to an example of the disclosure.

DETAILED DESCRIPTION

Examples of a load beam are described herein that include a lifter tab extending towards a distal end, a dustpan defined by a dustpan forming line at a proximal end and the lifter tab at a distal end and a first and second plurality of rail sections separated by a longitudinal axis. The first and second plurality rail sections including a rear rail, an intermediate rail, and a front rail. The rear rail extends from a proximal end of the load beam to the first intermediate rail, the intermediate rail extends from the first rear rail to the dustpan forming line, and the front rail extends from the dustpan forming line to a proximal end of the lifter tab.

Figure 1:
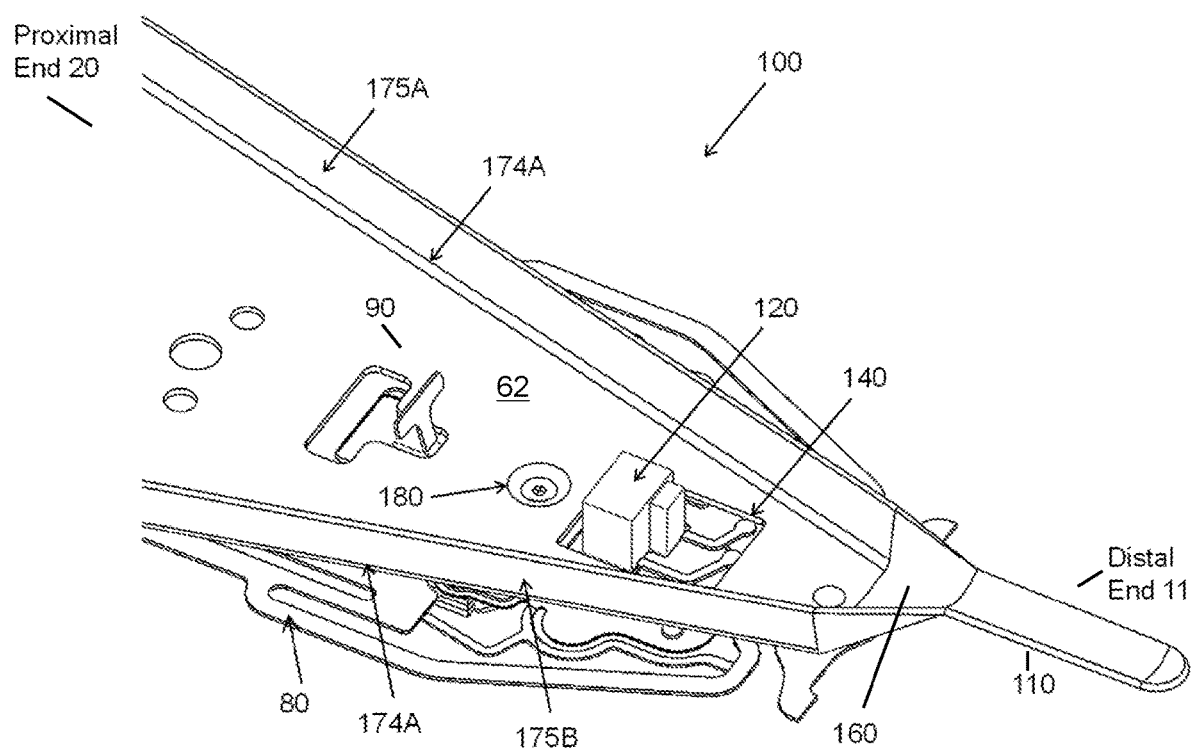
FIG. 1 illustrates a suspension assembly, according to an example of the disclosure.

FIG. 1 illustrates a suspension assembly 100, according to an example of the disclosure. The suspension assembly 100 can be configured as a heat assisted magnetic recording (HAMR) suspension. HAMR generally refers to the concept of locally heating a recording media to reduce the coercivity of the media so that an applied magnetic writing field can more easily direct the magnetization of the media during the temporary magnetic softening of the media caused by the heat source. A laser diode 120 may be used to heat a portion of the recording media. Then the heated portion is subjected to a magnetic field that sets the direction of magnetization of the heated portion. It should be understood, the present disclosure may be implemented in any disk drive suspension assemblies.

The suspension assembly 100 also includes a load beam 90 having side rails 175A, 175B extending along at least portions of a first edge 174A and a second edge 174B, respectively. The side rails 175A, 175B of the load beam 90 are provided to improve the frequency response of the suspension assembly 100. Load beam 90 is formed from a material such as stainless steel or other acceptable materials and includes a mounting region adapted to mount the load beam 90 to an actuator arm. The mounting region is located towards a proximal end 20 of the load beam 90.

The load beam 90 also includes a rigid region 62 positioned distally from the mounting region and extending longitudinally toward a distal end 11 of the load beam 90.

A flexure 80, which supports a slider for reading data from and writing data to a disk drive, is mounted to the load beam 90. According to some embodiments, a laser diode 120 extends from the flexure 80. The load beam 90 can define a load beam window 140 to enable the laser diode 120 to extend beyond the rigid region 62 of the load beam 90. In some embodiments, the flexure 80 and the load beam 90 are fixed together to enable a portion of the flexure 80 to move generally free of the load beam 90. The load beam 90 includes a dimple 180 configured to contact the flexure 80 to transfer a force to the flexure 80 to a generally parallel attitude and desired height with respect to the surface of a disk.

FIG. 2 illustrates a top view of a load beam 90 of the suspension assembly of FIG. 1, according to an example of the disclosure. The load beam 90 further includes a dustpan 160 and a lifter tab 110 extending distally from the rigid region 62. According to some embodiments, the load beam 90 includes first and second side rails 175A, 175B extending from the mounting region to the lifter tab 110. The first side rail 175A includes two regions, according to some embodiments.

The first side rail 175A includes a first rear rail 176A extending from the mounting region to a dustpan forming location 161 and a first front rail 173A extending the length of the dustpan 160, according to some embodiments. The second side rail includes two regions. The second side rail 175B includes a second rear rail 176B extending from the mounting region to a dustpan forming location 161 and a second front rail 173B extending the length of the dustpan 160, according to some embodiments.

FIG. 3 illustrates a side view of the load beam 90, according to an example of the disclosure. The dustpan 160 is displaced between the first and second front rails 173A, 173B and extends in a longitudinal direction from the proximal end 20 to the distal end 11. The distal end of the dustpan 160 is a higher elevation compared to the proximal end of the dustpan 160. The lifter tab 110 extends in the longitudinal direction towards the distal end 11 along the higher elevation. The length D of the dustpan 160 is shortened in modern suspension assemblies to account for modern flexure designs.

As a result, the dustpan forming angle $A_0$ is increased to achieve a targeted offset height H of the lifter tab 110. Consequently, the load beam buckling tends to occur at the dustpan forming location 161.

Figure 4:
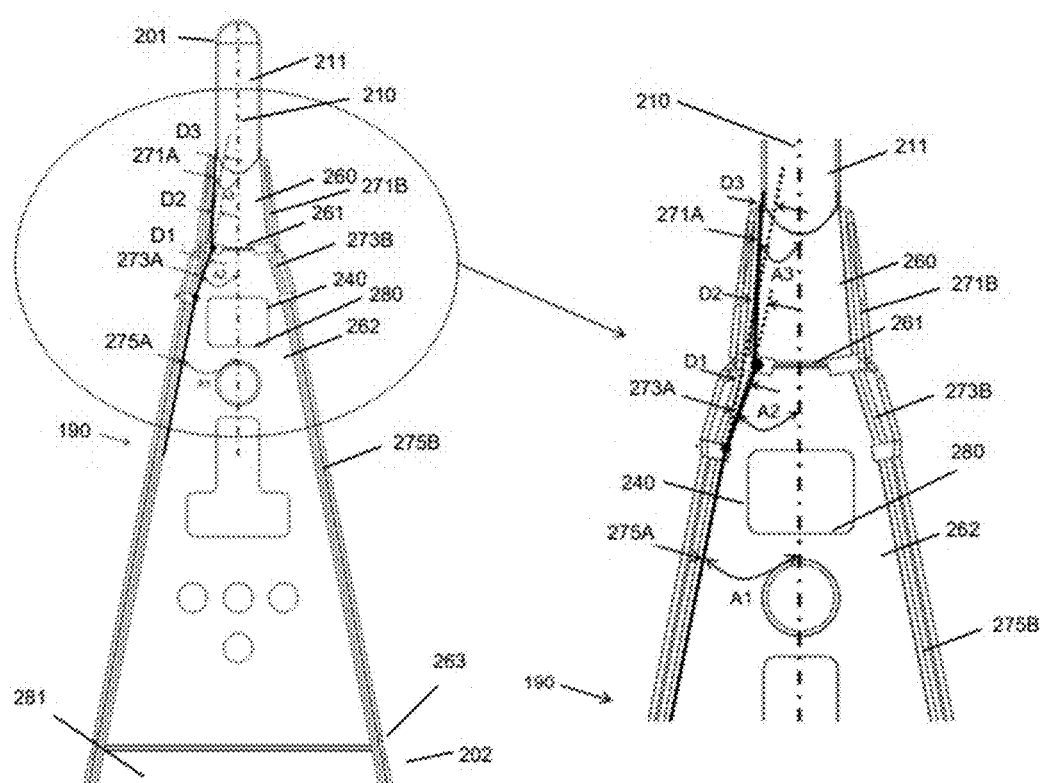
FIG. 4 illustrates a top view of a load beam of the suspension assembly, according to an example of the disclosure.

FIG. 4 illustrates a top view of a load beam of the suspension assembly, according to an example of the disclosure. Similar to the suspension assembly 100, the suspension assembly can be configured as a heat assisted magnetic recording (HAMR) suspension. The suspension assembly includes a load beam 190, with a longitudinal axis 210 extending from a proximal end 202 to a distal end 201. The load beam 190 further includes a dustpan 260 and a lifter tab 211 extending distally from a rigid region 262. The load beam 190 also defines a load beam window 240. The load beam window 240 is configured to enable a laser diode to extend beyond the load beam 190, according to some embodiments.

The load beam 190 includes a first side and a second side, separated by a longitudinal axis 210. The first side includes multiple rail sections. The second side includes multiple rail sections. For example, the first side includes a first rear rail 275A, a first intermediate rail 273A, and a first front rail 271A. The second side includes a second rear rail 275B, a second intermediate rail 273B, and a second front rail 271B. For some embodiments, the side rails of the load beam 190 are configured to improve the frequency response of the suspension assembly. While one side is being described in detail, the first side, it should be understood that the second side on the opposite side of the longitudinal axis 210 can have an identical structure. For example, the second side includes a second rear rail, a second intermediate rail, and a second front rail identical to the first side.

The first rear rail 275A, according to some embodiments, extends from the proximal end 202 to a trailing edge 280 of the load beam window 240. The first rear rail 275A is positioned at an angle $A_1$, which is defined as the angle between the longitudinal axis 210 and the first rear rail 275A. The first intermediate rail 273A extends from the trailing edge 280 of the load beam window 240 to a dustpan forming line 261, according for some embodiments. The first intermediate rail 273A is positioned at an angle $A_2$, which is defined as the angle between the longitudinal axis 210 and the first intermediate rail 273A.

The first rear rail 275A and the first intermediate rail 273A can be positioned such that a forming angle difference $D_1$, is negative. The forming angle difference $D_1$ represents the angle difference between angle $A_1$ of the first rear rail 275A and angle $A_2$ of the first intermediate rail 273A. The first front rail 271A, for some embodiments, extends from the dustpan forming line 261 to a proximal end of the lifter tab 211.

The first front rail 271A is positioned at an angle $A_3$, which is defined as the angle between the longitudinal axis 210 and the first front rail 271A. In some examples of the disclosure, the load beam 190 is configured such that the first front rail 271A is parallel or near-parallel to the longitudinal axis 210. In this example, the proximal end and the distal end of the first front rail 271A are about the same distance from the longitudinal axis 210.

In some alternative examples of the disclosure, the load beam 190 can be configured such that the angle $A_3$ of the first front rail 271A is negative with respect to the longitudinal axis 210. In this example, the proximal end of the first front rail 271A is closer to the longitudinal axis 210 than the distal end of the first front rail 271A.

The first front rail 271A and the first intermediate rail 273A can be positioned such that a forming angle difference $D_2$, is positive. The forming angle difference $D_2$ represents the angle difference between angle $A_3$ of the first front rail 271A and angle $A_2$ of the first intermediate rail 273A.

In some examples of the disclosure, the angle $A_2$ is larger than angle $A_1$ so that the distal end of the first intermediate rail 273A is closer to the longitudinal axis 210. This enables the first front rail 271A to have an angle $A_3$ that is smaller than, for example, an angle of the current state of the art in load beams. As the angle $A_3$ of the first intermediate rail 273A approaches zero or even negative values, the angle difference $D_2$ between angle $A_3$ of the first front rail 271A and angle $A_2$ of the first intermediate rail 273A increases. The increasing angle difference $D_2$ improves the buckling condition at the location of the dustpan forming line 261 over the current state of the art in load beams.

The load beam 190 also includes a rigid region 262 positioned distally from the mounting region 263 and extending longitudinally toward a distal end 201 of the load beam 190. For some embodiments, a surface of the rigid region 262 has a sag region 281, which is a bow in the surface of the rigid region as opposed to a crease of the type found when metal is formed by introducing a bend. In some examples, the rigid region 262 departs from the generally planar surface and compensates for the compression and tension required to form the side rails.

In some examples of the disclosure, the sag region has a generally constant width across the rigid region 262. In yet another example, the sag region does not extend across the entire width of the rigid region 262. Instead, the rigid region 262 has sag regions on each of the first and second sides of the longitudinal axis 210.

In an alternative example of the disclosure, the first intermediate rail 273A may extend from the sag region and extend to the dustpan forming line 261. In further alternative examples of the disclosure, the first intermediate rail 273A may extend from a location between the sag region and the proximal end 202, and extend to the dustpan forming line 261. In these examples, the distal end of the first intermediate rail 273A is positioned closer to the longitudinal axis 210, causing the first front rail 271A to have a larger negative angle $D_3$, and thereby further improving the rail buckling at the dustpan forming line 261.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present disclosure" as used herein should not be construed to mean that only a single disclosure having a single essential element or group of elements is presented. Similarly, it will also be appreciated that the term "present disclosure" encompasses a number of separate innovations, which can each be considered separate disclosures. Although the present disclosure has been described in detail with regards to the preferred embodiments and drawings thereof, it should be apparent to those skilled in the art that various adaptations and modifications of embodiments of the present disclosure may be accomplished without departing from the spirit and the scope of the disclosure.

We claim:

1. A load beam comprising:
   a lifter tab;
   a dustpan defined by a dustpan forming line;
   a first plurality of rail sections on a first side of a longitudinal axis; and
   a second plurality of rail sections on a second side of the longitudinal axis, the first and second plurality of rail sections each including a rear rail, an intermediate rail, and a front rail, the rear rail extends from a proximal end of the load beam to the intermediate rail of each of the first and second plurality of rail sections, the intermediate rail of each of the first and second plurality of rail sections extends from the rear rail to the dustpan forming line, wherein the rear rail and the intermediate rail are angled such that a first forming angle difference D1 between the rear rail and the intermediate rail of each of the first and second plurality of rail sections is negative, and the front rail extends from the dustpan forming line to a proximal end of the lifter tab, wherein the intermediate rail and the front rail are angled such that a second forming angle difference D2 between the intermediate rail and the front rail of each of the first and second plurality of rail sections is positive.

2. The load beam of claim 1, wherein the rear rail of each of the first and second plurality of rail sections extends from the proximal end of the load beam to a trailing edge of a load beam window.

3. The load beam of claim 1, wherein the rear rail of each of the first and second plurality of rail sections is positioned at an angle between the longitudinal axis and the rear rail of each of the first and second plurality of rail sections.

4. The load beam of claim 1, wherein the intermediate rail of each of the first and second plurality of rail sections is positioned at an angle between the longitudinal axis and the intermediate rail of each of the first and second plurality of rail sections.

5. The load beam of claim 1, wherein the intermediate rail of each of the first and second plurality of rail sections extends from a sag region of the load beam and extends to the dustpan forming line.

6. The load beam of claim 5, wherein the intermediate rail of each of the first and second plurality of rail sections extends from a location between the sag region and the proximal end of the load beam, and extends to the dustpan forming line.

7. A suspension comprising:
   a flexure assembly; and
   a load beam mounted to the flexure assembly, the load beam comprising:
      a lifter tab extending towards a distal end of the load beam;
      a dustpan defined by a dustpan forming line; and
      a first plurality of rail sections on a first side of a longitudinal axis; and
      a second plurality of rail sections on a second side of the longitudinal axis,
      the first and second plurality of rail sections each including a rear rail, an intermediate rail, and a front rail, the rear rail extends from a proximal end of the load beam to the intermediate rail of each of the first and second plurality of rail sections, the intermediate rail of each of the first and second plurality of rail sections extends from the rear rail to the dustpan forming line, wherein the rear rail and the intermediate rail are angled such that a first forming angle difference D1 between the rear rail and the intermediate rail of each of the first and second plurality of rail sections is negative, and the front rail extends from the dustpan forming line to a proximal end of the lifter tab, wherein the intermediate rail and the front rail are angled such that a second forming angle difference D2 between the intermediate rail and the front rail of each of the first and second plurality of rail sections is positive.

8. The suspension of claim 7, wherein the suspension is configured as a heat assisted magnetic recording (HAMR) suspension.

9. The suspension of claim 7, wherein the rear rail of each of the first and second plurality of rail sections extends from the proximal end of the load beam to a trailing edge of a load beam window.

10. The suspension of claim 7, wherein the rear rail of each of the first and second plurality of rail sections is positioned at an angle between the longitudinal axis and the rear rail of each of the first and second plurality of rail sections.

11. The suspension of claim 7, wherein the intermediate rail of each of the first and second plurality of rail sections is positioned at an angle between the longitudinal axis and the intermediate rail of each of the first and second plurality of rail sections.

12. The suspension of claim 7, wherein the intermediate rail of each of the first and second plurality of rail sections extends from a sag region of the load beam and extends to the dustpan forming line.

13. The suspension of claim 12, wherein the intermediate rail of each of the first and second plurality of rail sections extends from a location between the sag region and the proximal end of the load beam, and extends to the dustpan forming line.

\* \* \* \* \*